US011466456B2

(12) United States Patent
Kim et al.

(10) Patent No.: US 11,466,456 B2
(45) Date of Patent: Oct. 11, 2022

(54) METHOD OF MANUFACTURING THREE-DIMENSIONAL TEXTILE REINFORCEMENT MEMBER AND METHOD OF CONSTRUCTING TEXTILE-REINFORCED CONCRETE STRUCTURE USING THE SAME

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Kyung Taek Koh, Gyeonggi-do (KR); Gum Sung Ryu, Gyeonggi-do (KR); Gi Hong An, Gyeonggi-do (KR); Dong Woo Seo, Gyeonggi-do (KR); Young Jun You, Gyeonggi-do (KR); Seung Hun Park, Seoul (KR); Ga Young Kim, Daejeon (KR); Seung Seop Jin, Incheon (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 1017 days.

(21) Appl. No.: 16/174,290

(22) Filed: Oct. 30, 2018

(65) Prior Publication Data
US 2020/0032514 A1    Jan. 30, 2020

(30) Foreign Application Priority Data

Jul. 30, 2018    (KR) .................. KR10-2018-0088766

(51) Int. Cl.
*E04C 5/06*    (2006.01)
*B29C 53/02*    (2006.01)
(Continued)

(52) U.S. Cl.
CPC ............ *E04C 5/0627* (2013.01); *B29C 53/02* (2013.01); *B32B 13/04* (2013.01); *D03D 9/00* (2013.01);
(Continued)

(58) Field of Classification Search
CPC ......... B32B 13/00; E04C 5/0627; E04C 5/07; E04C 5/00; E02D 3/00; E02D 17/202;
(Continued)

(56) References Cited

U.S. PATENT DOCUMENTS 3,814,030 A  *  6/1974  Morgan, III  .......  B65D 19/0038
                                                 297/452.64
4,819,395 A      4/1989  Sugita et al.
(Continued)

FOREIGN PATENT DOCUMENTS

KR    100324502    2/2002
KR    200296423    11/2002
(Continued)

OTHER PUBLICATIONS

Textile Glossary, Celanese Acetate, copyright 2001 (Year: 2001).*

*Primary Examiner* — Jennifer A Steele
(74) *Attorney, Agent, or Firm* — JCIPRNET

(57) ABSTRACT

Provided are a method of manufacturing a three-dimensional textile reinforcement material and a method of constructing a textile reinforced concrete structure using a three-dimensional textile reinforcement material. A two-dimensional grid is bent into a three-dimensional shape using a two-dimensionally woven or knitted textile grid, and the bent grid is coupled with at least one two-dimensional grid, and thus the three-dimensional textile reinforcement material can be simply and easily formed. The three-dimensional textile reinforcement material can be formed by coating the coupled two-dimensional grid and a three-dimensional grid with a thermosetting resin and curing the coupled grids to support a concrete pouring pressure. The three-dimensional textile reinforcement material is formed in a truss material, and the three-dimensional textile reinforcement material with high bending strength can be manufactured, thus a concrete pouring pressure can be supported when a textile (Continued)

reinforced concrete structure is constructed using the three-dimensional textile reinforcement material.

7 Claims, 13 Drawing Sheets

(51) Int. Cl.
    *D03D 25/00*     (2006.01)
    *D03D 9/00*     (2006.01)
    *E04C 5/07*     (2006.01)
    *D06M 13/53*     (2006.01)
    *D06M 23/14*     (2006.01)
    *D06M 15/70*     (2006.01)
    *D06M 15/705*     (2006.01)
    *B32B 13/04*     (2006.01)

(52) U.S. Cl.
    CPC .......... *D03D 25/005* (2013.01); *D06M 13/53* (2013.01); *D06M 15/70* (2013.01); *D06M 15/705* (2013.01); *D06M 23/14* (2013.01); *E04C 5/07* (2013.01)

(58) Field of Classification Search
    CPC .... E02D 2300/0084; E02D 2300/0087; E02D 2300/009; D06M 15/70
    See application file for complete search history.

(56)     References Cited

U.S. PATENT DOCUMENTS

| | | | |
|---|---|---|---|
| 5,836,715 A | * | 11/1998 | Hendrix ................ B29C 70/222 |
| | | | 404/70 |
| 6,263,629 B1 | * | 7/2001 | Brown, Jr. .............. E04C 2/044 |
| | | | 442/179 |
| 6,426,029 B1 | * | 7/2002 | Hiscock ............. B28B 19/0046 |
| | | | 264/241 |
| 2005/0055953 A1 | * | 3/2005 | Sacks .................... E04C 5/0627 |
| | | | 52/633 |

FOREIGN PATENT DOCUMENTS

| | | |
|---|---|---|
| KR | 101109606 | 2/2012 |
| KR | 101160937 | 7/2012 |
| KR | 101186506 | 10/2012 |
| KR | 101276490 | 6/2013 |
| KR | 101851903 | 4/2018 |

* cited by examiner a)

b)

METHOD OF MANUFACTURING THREE-DIMENSIONAL TEXTILE REINFORCEMENT MEMBER AND METHOD OF CONSTRUCTING TEXTILE-REINFORCED CONCRETE STRUCTURE USING THE SAME

CROSS-REFERENCE TO RELATED APPLICATION

This application claims priority to and the benefit of Korean Patent Application No. 2018-0088766, filed on Jul. 30, 2018, the disclosure of which is incorporated herein by reference in its entirety.

BACKGROUND

1. Field of the Invention

The present disclosure relates to a three-dimensional textile reinforcement member, and more specifically, to a method of manufacturing a three-dimensional textile reinforcement member manufactured using a two-dimensionally weaved or knitted textile grid, and a method of constructing a textile reinforced concrete structure using the same.

2. Discussion of Related Art

Generally, lattice-shaped geogrids (hereinafter, referred to as "grid") are a reinforcement material used for retaining wall reinforcement, slope reinforcement, ground reinforcement, and the like when civil engineering construction is conducted. The grid requires high tensile strength and low tensile strain in addition to workability, frictional property, and the like.

A method of manufacturing a grid generally includes injection-molding or extruding a plastic material, punching the injection-molded and extruded plastic material, and uniaxially and biaxially elongating the plastic. However, the lattice-shaped grid using the extruded plastic has low tensile strength, is difficult to manufacture in an in-line process, and has limitations in size or shape.

Recently, the reinforcement material, which is manufactured by preparing a textile grid fabric formed by weaving or knitting high strength fabric into a lattice-shaped fabric, coating a surface of the fabric with a resin coating solution such as polyvinyl chloride, bitumen, acryl, latex, rubber-based resin, or the like, and performing high temperature heating treatment, is effectively used to newly construct and reinforce a concrete structure.

Further, the textile grid uses a higher strength fiber than a plastic grid to have high tensile strength and low tensile strain so as to have structural material properties excellent in building and reinforcing a structure.

FIG. 1A is a view illustrating a two-dimensional grid 11 formed of a general textile grid, and FIG. 1B is a view illustrating a concrete panel reinforced by the textile grid.

As shown in FIG. 1B, the two-dimensional grid formed of the textile grid 11 processed by weaving the high strength fiber, such as glass fiber, carbon fiber, Basalt fiber, and the like, to have a lattice shape is widely used in construction fields and civil engineering fields, especially as a reinforcement material of a lightweight and thin layer structure.

FIG. 2 is an example view illustrating a textile grid weaving machine.

The methods of manufacturing the textile grid are various, but as shown in FIG. 2, a textile grid 23 may be generally woven in a lattice shape in a method of alternately coupling a weft 21 and a warp 22 for mass production.

The textile grids 11 and 23 are disposed in a neutral axis of the thin layer structure, wherein the neutral axis theoretically does not receive stress in a bending structure, and thus it is necessary to move the textile grids 11 and 23 in an upper or lower direction.

Meanwhile, the textile reinforced concrete constructed using the textile grid 11, which is used for a construction member and a thin layer civil engineering structure due to lightweight properties, alternately receives tensile strain and compression due to bending moment, and thus the textile grid reinforcement materials may be disposed in a two-layered structure.

FIG. 3 is a view showing a woven textile reinforcement material with a multi-layered structure according to a conventional art.

To manufacture the textile reinforcement material with a multi-layered structure, as shown in FIG. 3, a plurality of plastic-based strand spacers 33 are knitted between an upper two-dimensional grid 31 and a lower two-dimensional grid 32 in a vertical direction to maintain a space therebetween.

Meanwhile, problems in manufacturing and using the three-dimensional textile reinforcement material according to the conventional art are as follows.

First, to construct the textile grid reinforced concrete structure, the textile reinforcement material should be accurately disposed at a predetermined position within a cross section of a corresponding structure, and cement mortar or concrete should be poured around the reinforcing material, and a cross section should be completed. Particularly, a position of the reinforcement material is determined according to structural calculation, and the textile reinforcement material should resist a concrete pouring pressure and impact. For example, to construct the textile reinforced concrete slab, a plurality of spacers are installed between a mold and the reinforcement material, and concrete is poured. Generally, since the textile reinforcement material is flexible, it is hard to maintain the position of the reinforcement material when concrete is poured even when the spacers are densely disposed.

Further, it is not generally possible for the multi-layered three-dimensional grid according to the conventional art to be woven or knitted by a manufacturer manufacturing a two-dimensional grid, and a separate expensive weaving machine for the three-dimensional weaving or kitting should be prepared, and thus high manufacturing costs are required.

Further, the spacers formed in the multi-layered three-dimensional grid according to the conventional art do not structurally distribute, but are insufficient to support a concrete pouring load. When the spacers are densely disposed to support the concrete pouring load, it is hard for concrete to be compacted when the concrete is poured.

Further, FIG. 4 is an example view illustrating a textile grid manufactured in a method of weaving a textile grid according to a conventional art. As shown in FIG. 4, since the textile grid manufactured in the method of weaving the textile grid according to the conventional art is woven by twisting a warp 40, elongation in the warp direction is greater than elongation in a weft direction of the straightly disposed weft 50, which is a main direction, and thus the textile grid manufactured in the method of weaving the textile grid has limitations in being used as a reinforcement material of a bidirectional structure such as a slab.

Further, a grid rotating at a right angle may overlap a first grid for bidirectional reinforcement using the textile grid manufactured in the weaving method according to the conventional art, but there is a problem in economic feasibility and constructability.

PRIOR ART LITERATURE (Patent Document 0001) Korean Registration Patent No. 10-1109606 (Date of Filing: Mar. 15, 2011), Title of Invention: "Textile Geogrid and Manufacturing Method Thereof"

(Patent Document 0002) Korean Registration Patent No. 10-1186506 (Date of Filing: Jan. 9, 2012), Title of Invention: "Method of Manufacturing Lattice-Shaped Textile Geogrid and Textile Geogrid Formed Thereby"

(Patent Document 0003) Korean Registration Patent No. 10-1276490 (Date of Filing: Nov. 19, 2012), Title of Invention: "Textile Geogrid for Ground Reinforcement"

(Patent Document 0004) Korean Registration Patent No. 10-1851903 (Date of Filing: Sep. 7, 2017), Title of Invention: "Textile Geogrid"

(Patent Document 0005) Korean Registration Patent No. 10-324502 (Date of Filing: Apr. 18, 2000), Title of Invention: "Textile Geogrid"

(Patent Document 0006) Korean Registration Patent No. 10-1160937 (Date of Filing: Mar. 19, 2009), Title of Invention: "Three-Dimensional Fiber and Manufacturing Method Thereof"

(Patent Document 0007) Korean Registration Patent No. 20-296423 (Date of Filing: Aug. 21, 2002), Title of Invention: "Textile Geogrid"

SUMMARY OF THE DISCLOSURE

The present disclosure is directed to providing a method of manufacturing a three-dimensional textile reinforced material which allows a three-dimensional textile reinforcement material to be easily and simply formed by bending a two-dimensional grid into a predetermined shape using a two-dimensionally woven or knitted textile grid and coupling the bent grid with at least one two-dimensional grid, and a method of constructing a textile reinforced concrete structure using the same.

The present disclosure is directed to providing a method of manufacturing a three-dimensional textile reinforcement material which allows a three-dimensional textile reinforcement material to be formed by coating a two-dimensional grid, which is a textile grid, and a three-dimensional grid coupled with each other with a thermosetting resin to support a concrete pouring pressure and curing the two-dimensional grid and the three-dimensional grid, and a method of constructing a textile reinforced concrete structure using the same.

The present disclosure is directed to providing a method of manufacturing a three-dimensional textile reinforced material which allows a three-dimensional textile reinforced material with high bending strength to be manufactured by forming a three-dimensional textile reinforced material as a truss structure, and a method of constructing a textile reinforced concrete structure using the same.

According to an aspect of the present disclosure, there is provided a method of manufacturing a three-dimensional textile reinforcement material which includes steps of (a) forming a first two-dimensional grid by impregnating a two-dimensionally woven textile grid in a thermosetting resin and heat curing the two-dimensionally woven textile grid, (b) forming a second two-dimensional grid by impregnating a two-dimensionally woven textile grid in a heated thermosetting resin and cool curing the two-dimensionally woven textile grid, (c) heat melting a bent position of the second two-dimensional grid to bend the second two-dimensional grid into a predetermined shape, (d) bending the second two-dimensional grid into a predetermined shape, (e) forming a three-dimensional grid by cool curing the bent second two-dimensional grid, and (f) forming a three-dimensional textile reinforcement material by coupling the first two-dimensional grid and the three-dimensional grid, wherein a two-dimensional grid is bent into a three-dimensional shape to form the three-dimensional grid, and the three-dimensional grid is inserted upward from a lower surface of the first two-dimensional grid so as to be primarily coupled therewith in order that the three-dimensional grid is coupled with the at least one first two-dimensional grid so that the three-dimensional textile reinforcement material has a three-dimensional structure.

The first two-dimensional grid in the step (a) may include a weft and a warp, and may be manufactured in a weaving method or by stitching a portion at which the weft and the warp of weft and warp fiber rovings, which are disposed in a lattice form at a predetermined distances, cross each other with a third fiber.

The second two-dimensional grid in the step (b) may include a weft and a warp, and a lattice distance in a warp direction of the second two-dimensional grid is the same as that of the first two-dimensional grid, but a lattice distance in a weft direction of the second two-dimensional grid may be greater than a lattice distance in a weft direction of the first two-dimensional grid.

When the second two-dimensional grid is bent in the step (d), a height of the bent grid may be the same as that of the three-dimensional textile reinforcement material, and the height of the three-dimensional textile reinforcement material may be adjusted according to a distance in the weft direction of the second two-dimensional grid.

The three-dimensional grid in the step (f), which is the bent second two-dimensional grid, may be inserted upward from the lower surface of the first two-dimensional grid, and the bent wefts on the second two-dimensional grid may be disposed on both sides of the first two-dimensional grid warp.

When the three-dimensional grid is bent, the second two-dimensional grid may be rotated at a right angle and coupled to the first two-dimensional grid so that the first two-dimensional grid may be reinforced to perform bidirectional supporting.

According to another aspect of the present disclosure, there is provided a method of constructing a textile reinforced concrete structure using a three-dimensional textile reinforcement material which includes the steps of (a) forming a three-dimensional textile reinforcement material by coupling a first two-dimensional grid, which is a textile grid, and a three-dimensional grid, (b) reinforcing the three-dimensional textile reinforcement material by impregnating the three-dimensional textile reinforcement material with a thermosetting resin and heat curing the three-dimensional textile reinforcement material, (c) disposing the three-dimensional textile reinforcement material at a predetermined position, and (d) completing a textile reinforced concrete structure by pouring cement mortar or concrete, wherein a two-dimensional grid is bent into a three-dimensional shape to form the three-dimensional grid, and the three-dimensional grid is coupled with at least one first two-dimensional grid so that the three-dimensional textile reinforcement material has a three-dimensional structure.

When upper and lower layers of the three-dimensional textile reinforcement material in the step (a) are coupled to the first two-dimensional grid, the coupled three-dimensional textile reinforcement material and the first two-dimensional grid may be formed in a truss structure functioning as a strut-tie so that the three-dimensional textile reinforcement material may have high bending strength.

When the three-dimensional textile reinforcement material in the step (c) is disposed in a slab or a wall mold and cement mortar or concrete is poured therein in the step (d), a position of a predetermined textile may be maintained without a separate spacer, and a concrete pouring pressure may be supported.

The three-dimensional textile reinforcement material may be manufactured and constructed in a multi-layered manner.

The three-dimensional textile reinforcement material may function as a shear connector required to integrate two layers when the first layer is constructed according to a construction process of a target concrete structure and forming a second layer is required.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

Figure 1A:
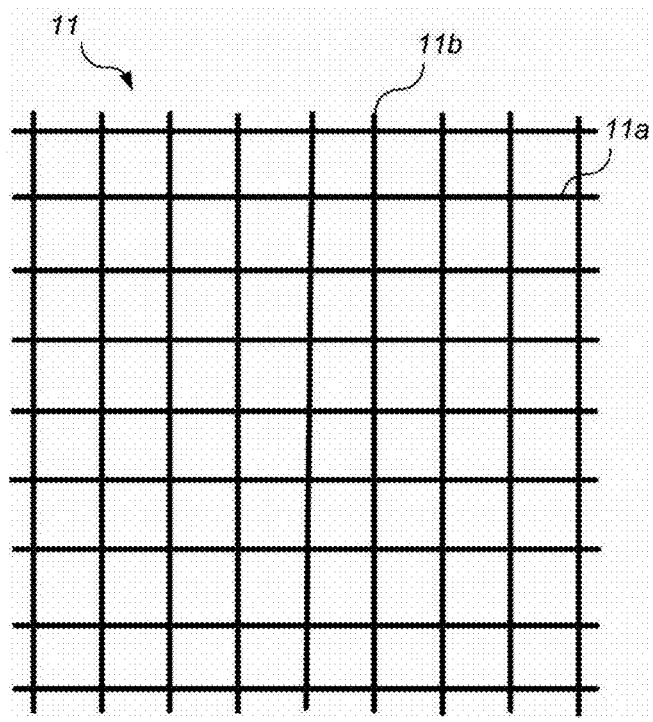
FIG. 1A is a view illustrating a two-dimensional grid formed of a general textile grid.
Figure 1B:
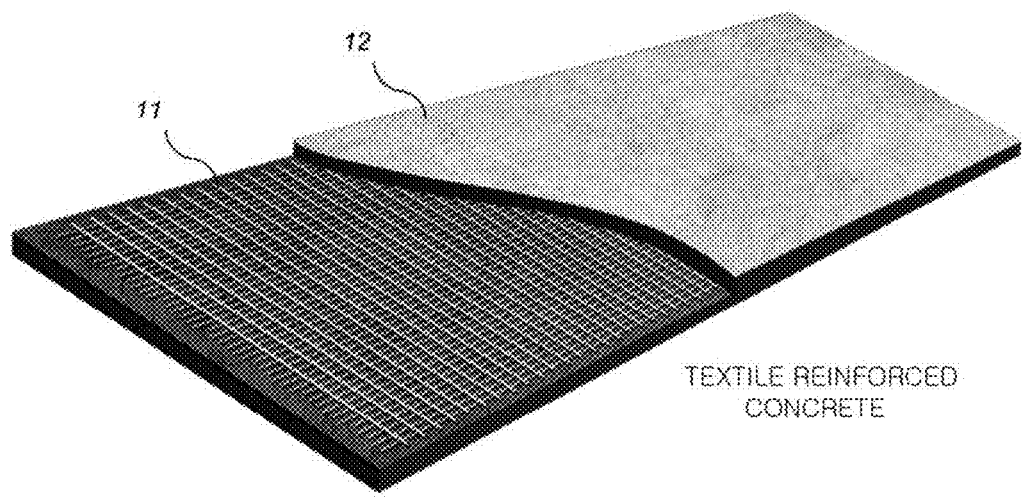
FIG. 1B is a view illustrating a concrete panel reinforced by a textile grid.
Figure 2:
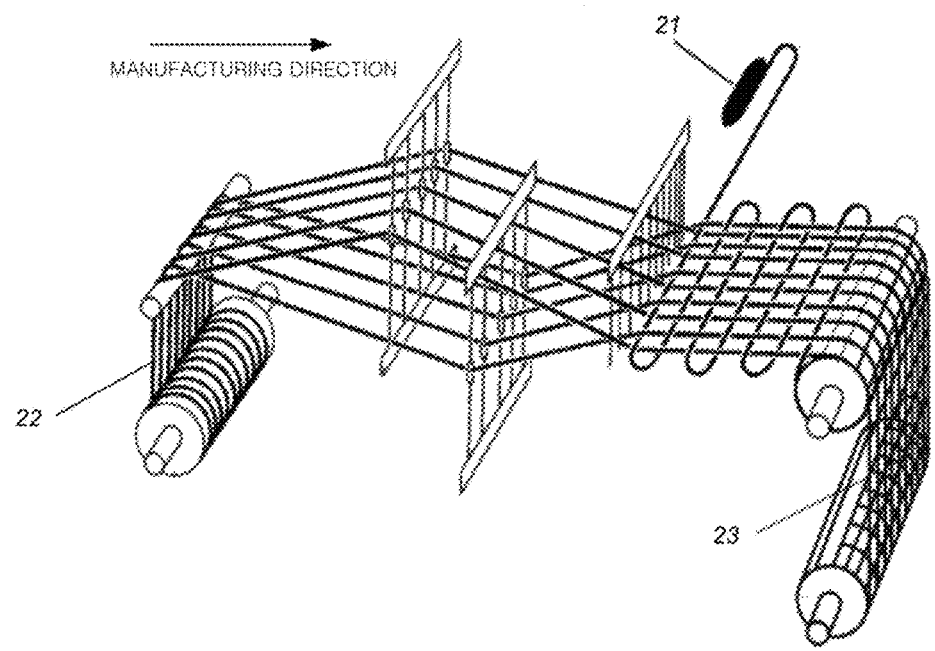
FIG. 2 is an example view illustrating a textile grid weaving machine.
Figure 3:
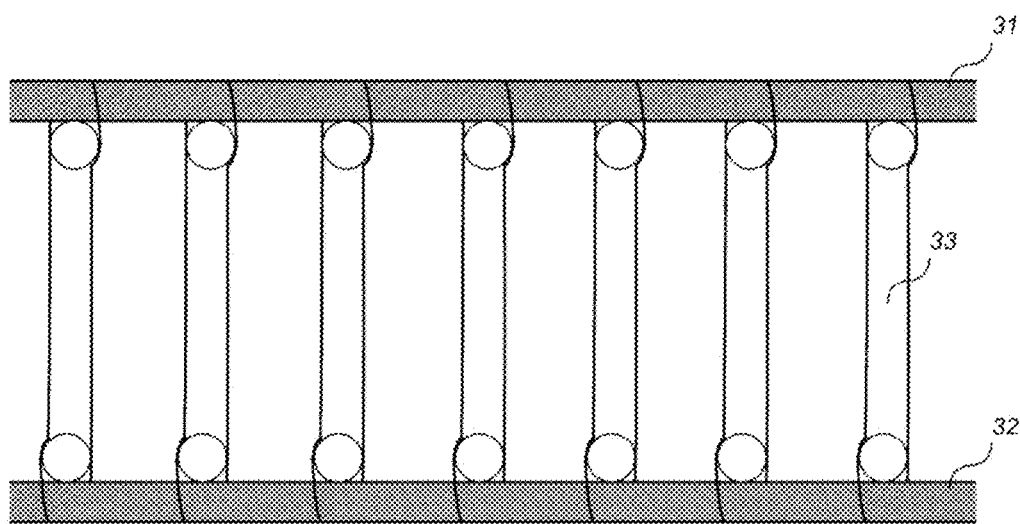
FIG. 3 is a view illustrating a woven textile reinforcement material with a multi-layered structure according to a conventional art.
Figure 4:
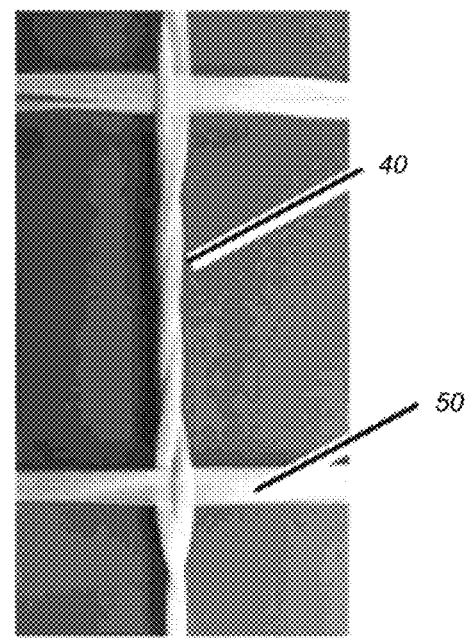
FIG. 4 is an example view illustrating a textile grid manufactured in a method of weaving a textile grid according to a conventional art.
Figure 4:
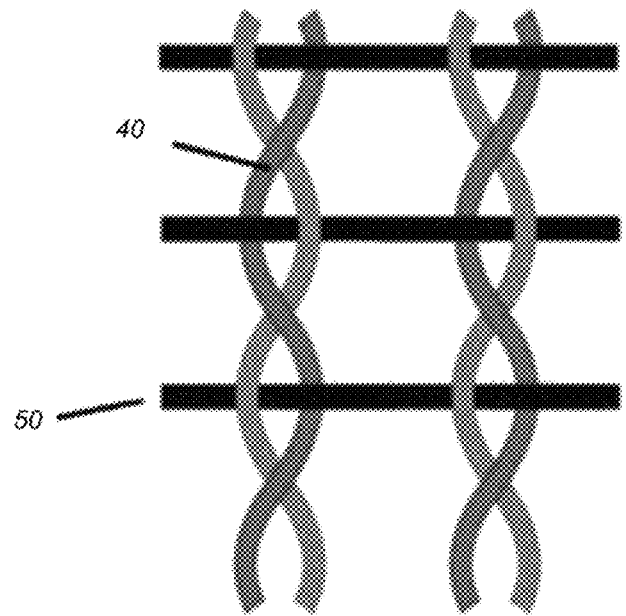

Hereinafter, embodiments that are easily performed by those skilled in the art will be described in detail with reference to the accompanying drawings. However, the embodiments of the present disclosure may be implemented in several different forms and are not limited to the embodiments described herein. In addition, parts irrelevant to description will be omitted in the drawings to clearly explain the embodiments of the present disclosure. Similar parts are denoted by similar reference numerals throughout this specification.

Throughout the specification, when a portion "includes" an element, the portion may include the element or another element may be further included therein, unless otherwise described.

[Three-Dimensional Textile Reinforcement Material]

Figure 5:
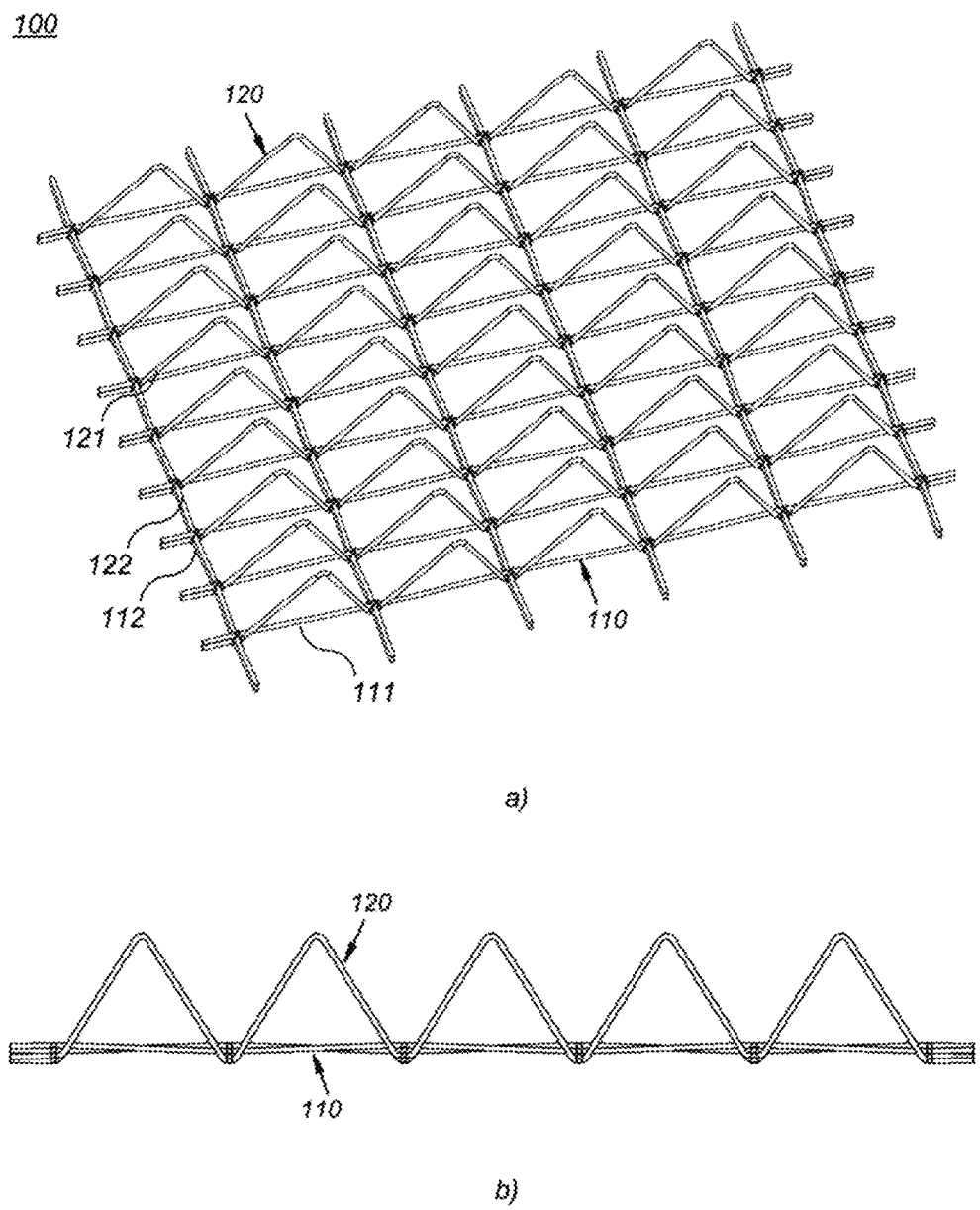
FIG. 5 is a view schematically illustrating a three-dimensional textile reinforcement material according to one embodiment of the present disclosure.

FIG. 5 is a view schematically illustrating a three-dimensional textile reinforcement material according to one embodiment of the present disclosure, FIG. 5A is a perspective view, and FIG. 5B is a side view.

As shown in FIG. 5, a three-dimensional textile reinforcement material 100 according to one embodiment of the present disclosure is formed by coupling a first two-dimensional grid 110 and a three-dimensional grid 120. The first two-dimensional grid 110 is a textile grid including a first two-dimensional grid weft 111 and a first two-dimensional grid warp 112, and the three-dimensional grid 120 includes a three-dimensional grid weft 121 and a three-dimensional grid warp 122.

The three-dimensional textile reinforcement material 100 according to one embodiment of the present disclosure is manufactured in a three-dimensional shape using a two-dimensionally woven textile grid, and specifically, the two-dimensional grid is bent into a three-dimensional shape and is coupled with at least one first two-dimensional grid 110, and thus the textile reinforcement material with a three-dimensional structure may be formed.

Hereinafter, the method of manufacturing a three-dimensional textile reinforcement material according to one embodiment of the present disclosure will be described with reference to FIGS. 6 through 8, and the method of constructing a textile reinforced concrete structure using a three-dimensional textile reinforcement material according to one embodiment of the present disclosure will be described with reference to FIGS. 9 and 10.

[Method of Manufacturing the Three-Dimensional Textile Reinforcement Material]

Figure 6:
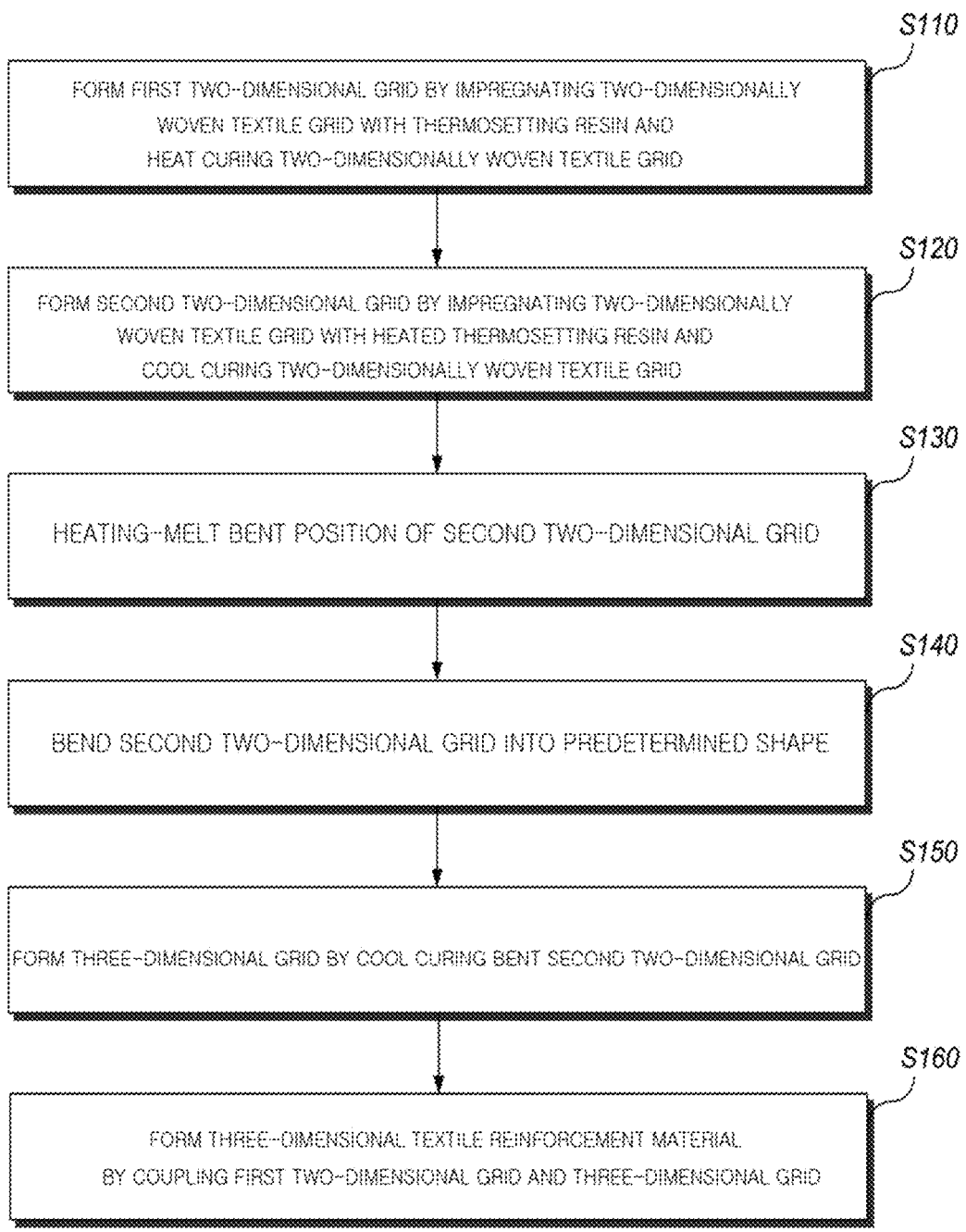
FIG. 6 is a process flowchart of a method of manufacturing a three-dimensional textile reinforcement material according to one embodiment of the present disclosure.
Figure 7A:
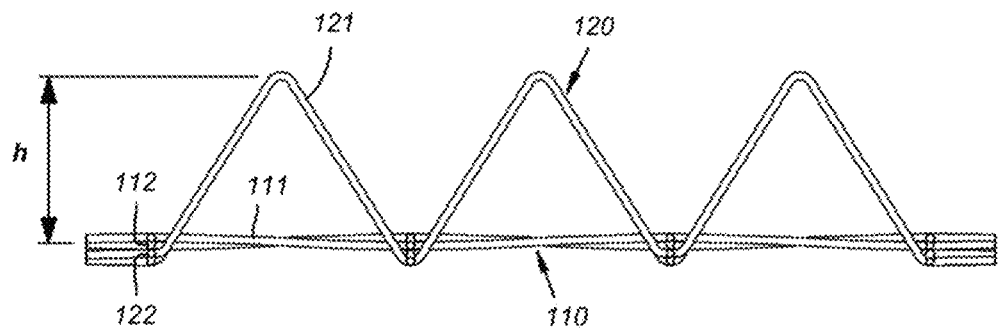
FIGS. 7A to 7E are views for specifically describing the method of manufacturing a three-dimensional textile reinforcement material according to one embodiment of the present disclosure.
Figure 7B:
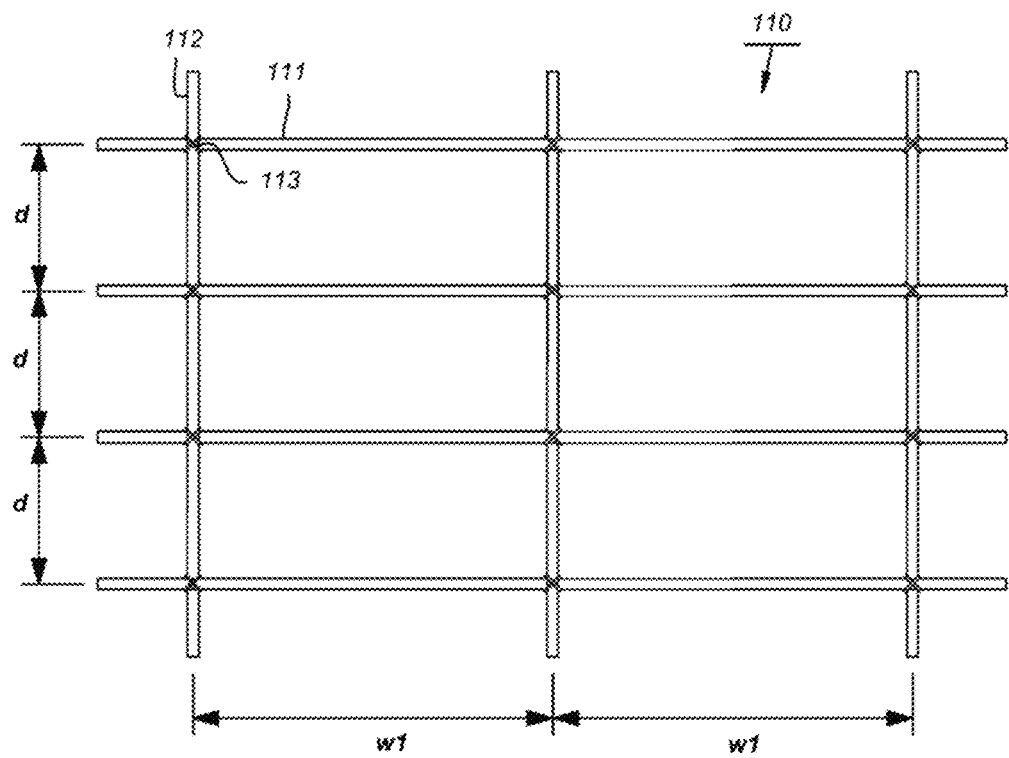
Figure 7C:
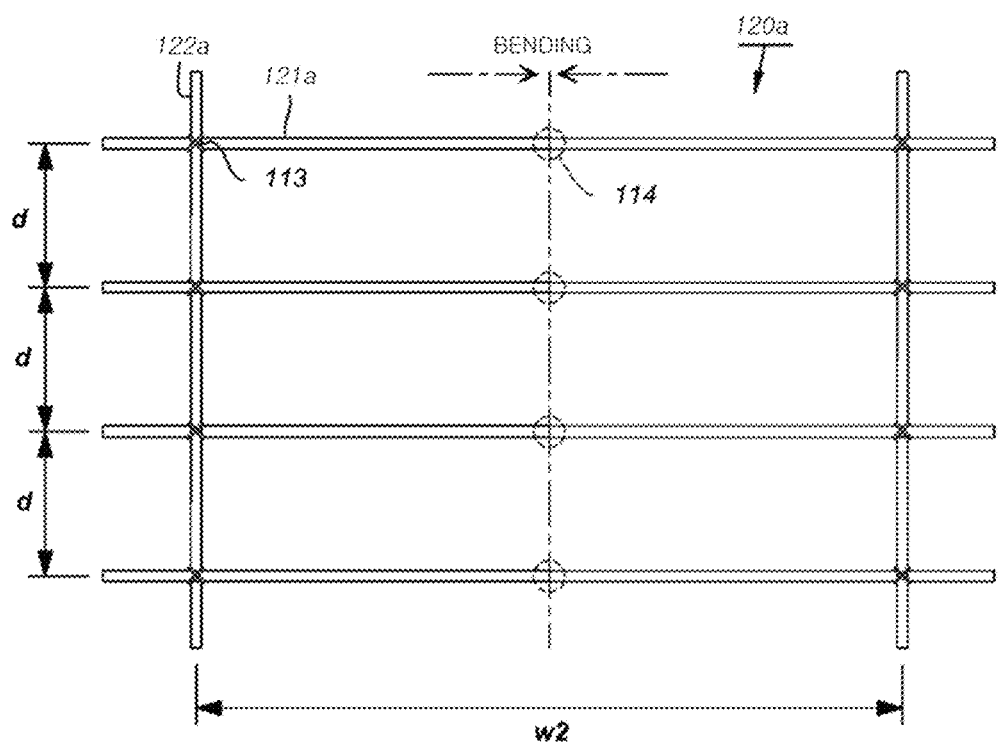
Figure 7D:
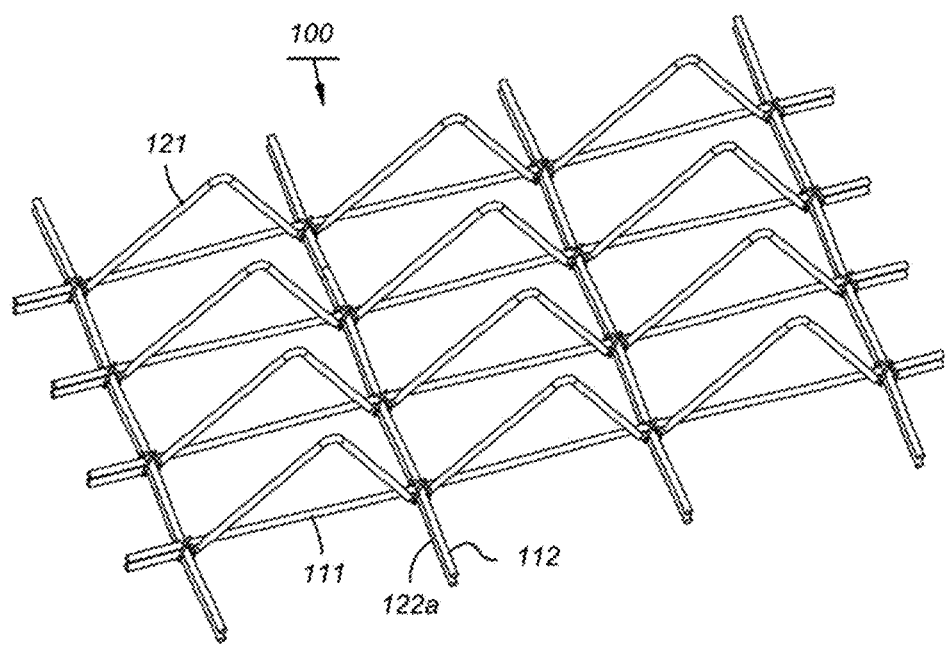
Figure 7E:
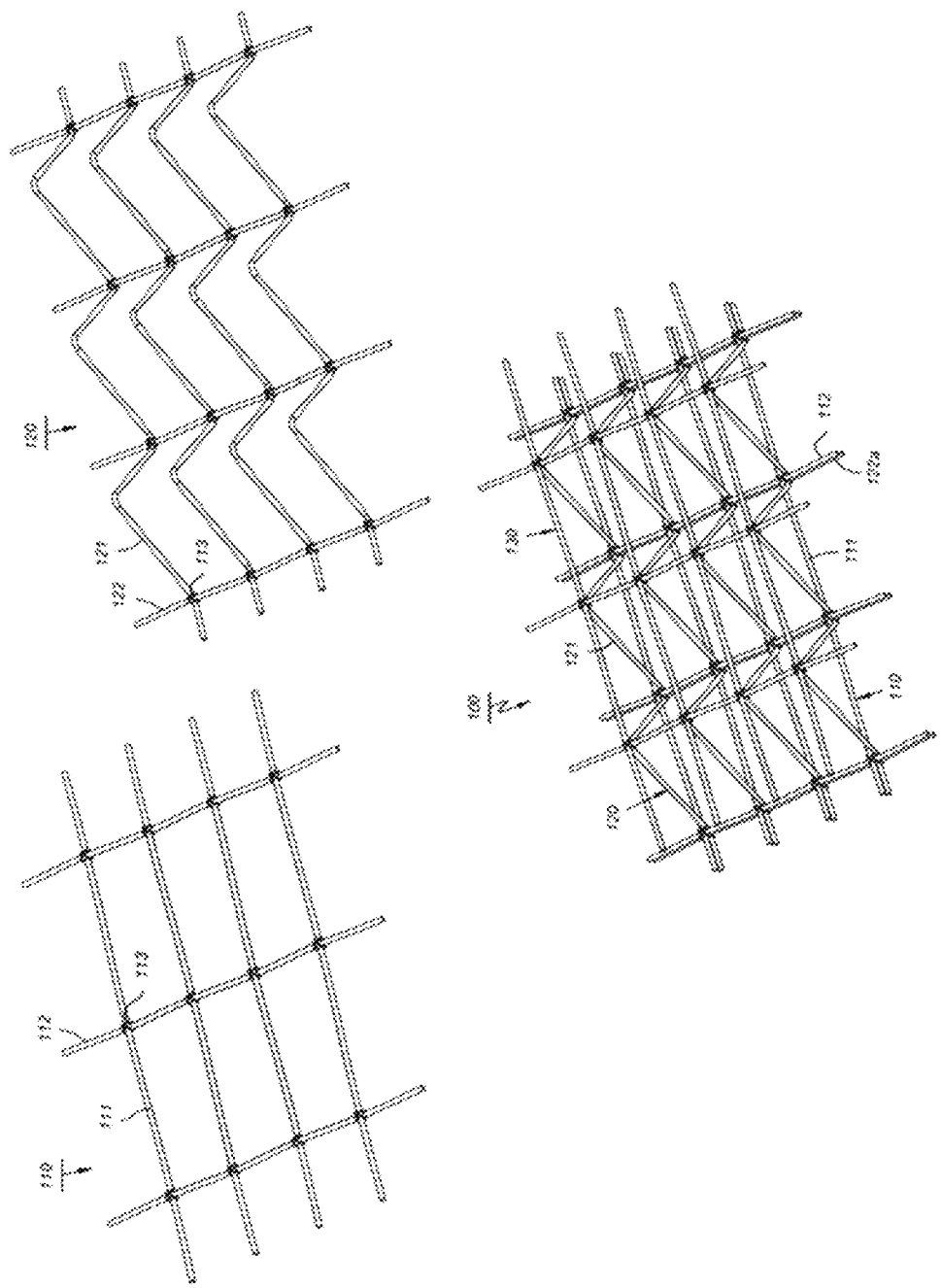
Figure 8A:
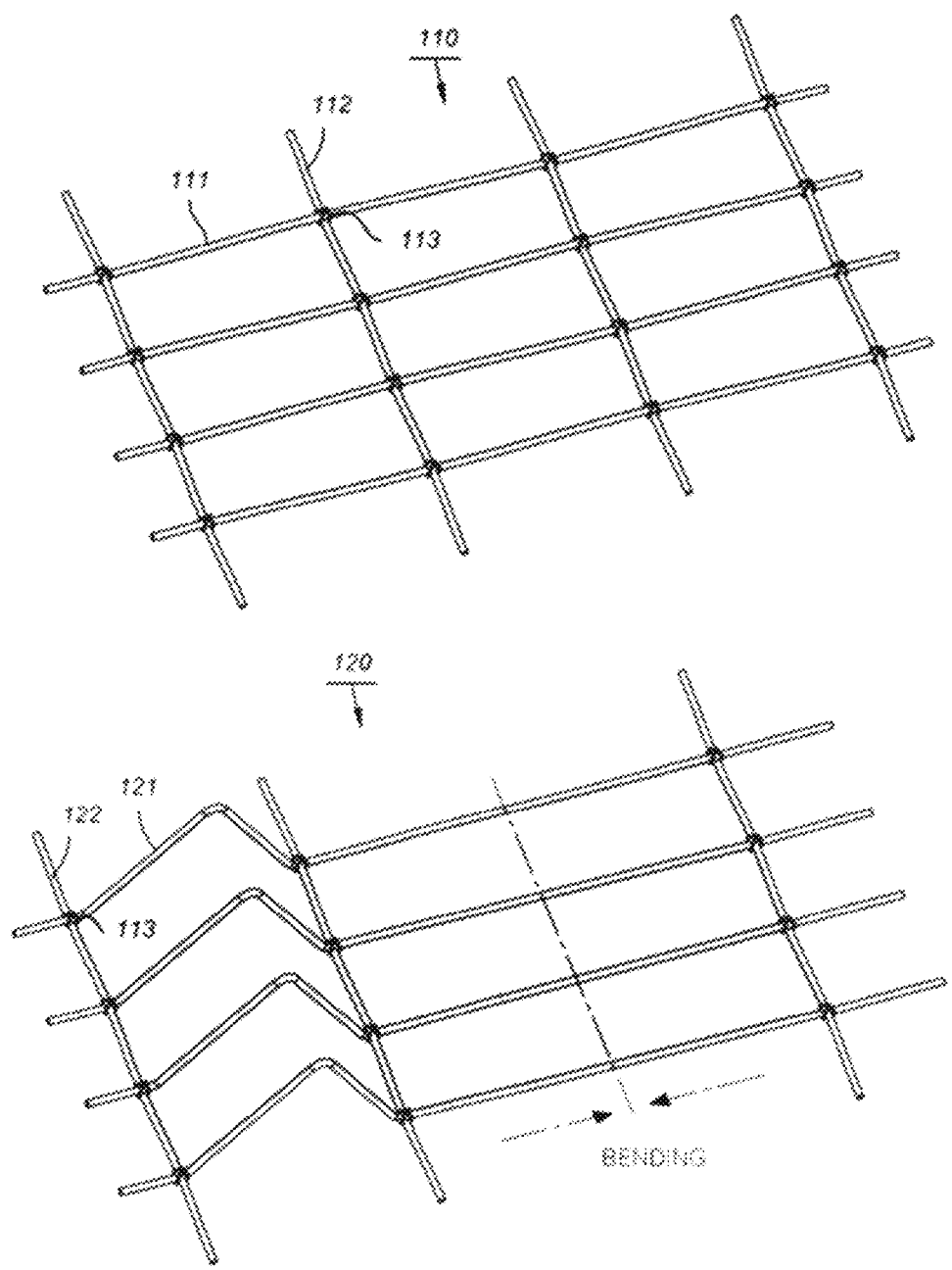
FIGS. 8A to 8C are views for specifically describing the method of manufacturing a three-dimensional textile reinforcement material according to one embodiment of the present disclosure.
Figure 8B:
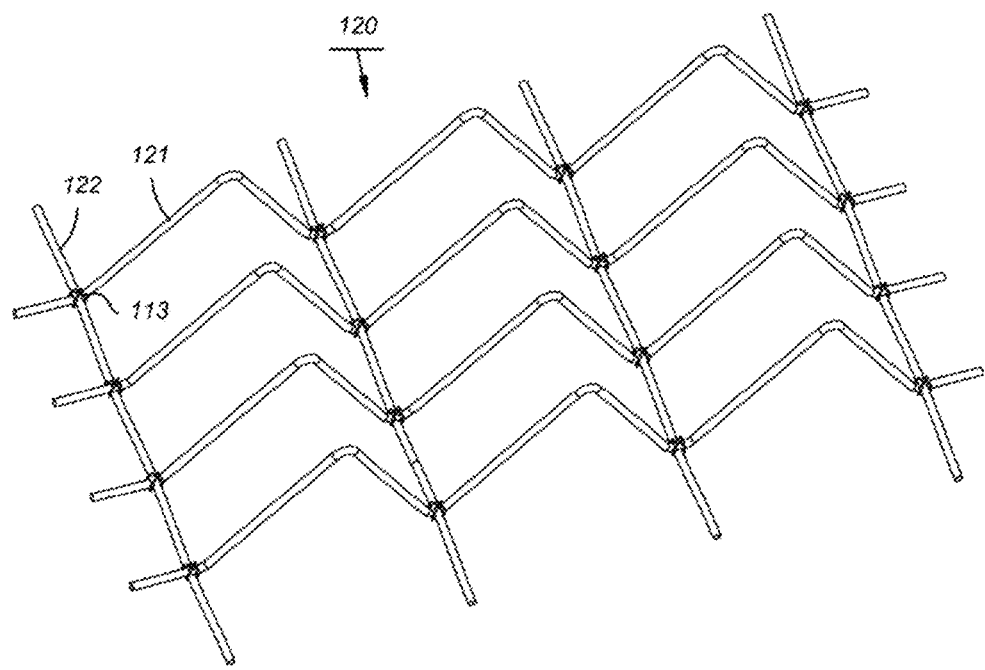
Figure 8C:
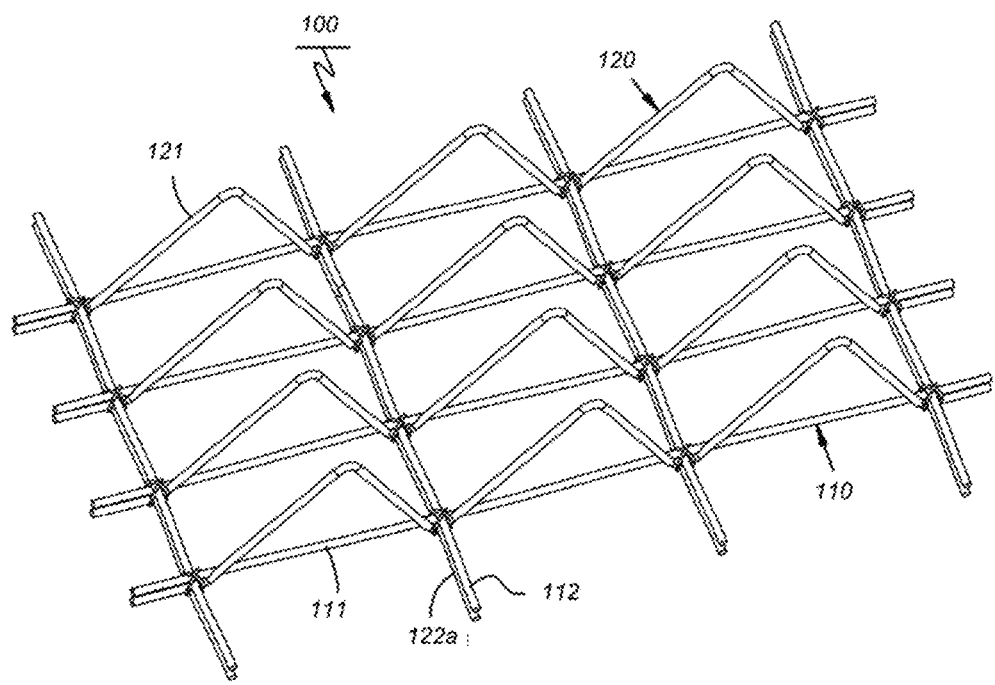

FIG. 6 is a process flowchart of a method of manufacturing a three-dimensional textile reinforcement material according to one embodiment of the present disclosure, FIGS. 7A to 7E are views for specifically describing the method of manufacturing a three-dimensional textile reinforcement material according to one embodiment of the present disclosure, and FIGS. 8A to 8C are views for specifically describing the method of manufacturing a three-dimensional textile reinforcement material according to one embodiment of the present disclosure.

Referring to FIG. 6, the method of manufacturing a three-dimensional textile reinforcement material according to one embodiment of the present disclosure is as follows. The first two-dimensional grid 110 is formed by impregnating the two-dimensionally woven or knitted textile grid in a thermosetting resin and heating the textile grid (S110) or curing the textile grid at room temperature (S110). Specifically, as shown in FIGS. 7A and 7B, the first two-dimensional grid 110 includes the weft 111 and the warp 112, or weft and warp fiber rovings are disposed in a lattice shape with predetermined distances, and a portion at which the weft 111 and the warp 112 cross each other is knitted by a third fiber 113 as shown in FIG. 7B. For example, FIG. 8A illustrates the first two-dimensional grid 110 formed of the textile grid.

Next, the second two-dimensional grid 120a is formed by impregnating the two-dimensionally woven textile grid in a heated thermosetting resin, such as vinyl ester resin, unsaturated polyesters, or the like, and cool curing the textile grid (S120). In this case, as shown in FIG. 7C, the second two-dimensional grid 120a includes the weft 121a and the warp 122a, and a lattice distance d in a warp direction of the second two-dimensional grid 120a is the same as that of the first two-dimensional grid 110, but a lattice distance w2 in a weft direction of the second two-dimensional grid 120a is greater than a lattice distance w1 in a weft direction of the first two-dimensional grid.

A bent position 114 of the second two-dimensional grid 120a is heated and melted to bend the second two-dimensional grid 120a into a predetermined shape (S130).

The second two-dimensional grid 120a is bent into a predetermined shape (S140). The weft 121a of the second two-dimensional grid 120a is bent, and a triangular shape is formed. In this case, the lattice distance w2 in the weft direction of the second two-dimensional grid 120a is related to a height h of the three-dimensional textile reinforcement material 100 shown in FIG. 7A, and when the second two-dimensional grid 120a is bent in the weft direction as shown in FIG. 7C, a height of the bent grid is the same as that of the three-dimensional textile reinforcement material 100, and thus a height of the three-dimensional textile reinforcement material 100 may be adjusted according to a distance in the weft direction of the second two-dimensional grid 120a.

The three-dimensional grid 120 is formed by cool curing the bent second two-dimensional grid 120a (S150).

The three-dimensional textile reinforcement material 100 is formed by coupling the first two-dimensional grid 110 and the three-dimensional grid 120 (S160). Specifically, as shown in FIG. 7D, the three-dimensional grid 120, which is the bent second two-dimensional grid, is inserted upward from a lower surface of the first two-dimensional grid 110, and the bent wefts 121 on the second two-dimensional grid are disposed on both sides of the first two-dimensional grid warp 112. In this case, when the three-dimensional grid 120 is inserted upward from the lower surface of the first two-dimensional grid 110, as shown in FIG. 7A, the weft 121 of the three-dimensional grid 120 is disposed at a lower surface of the first two-dimensional grid warp 112, and thus an effect in which the three-dimensional grid 120 and the first two-dimensional grid are physically separated by tensile force applied in a vertical direction of the three-dimensional textile reinforcement material and shear force applied in the weft direction can be suppressed. For example, when a thin plate concrete panel is constructed using the three-dimensional textile reinforcement material, bending stress and shear stress may be generated in the thin plate concrete panel. In this case, the first two-dimensional grid receives the first bending stress, and the three-dimensional grid 120 receives the shear stress. FIG. 8B is a view illustrating the three-dimensional grid 120 manufactured by bending the weft 121a of the second two-dimensional grid 120a into a predetermined shape. FIG. 8C illustrates the three-dimensional textile reinforcement material 100 of the present disclosure formed by coupling the first two-dimensional grid 110 and the three-dimensional grid 120.

Further, the above-described two-dimensional grid shown in FIG. 7A has directionality when the weft 111 and warp 112 are woven. When the second two-dimensional grid 120a is rotated at a right angle and is coupled with the first two-dimensional grid 110 when the three-dimensional grid shown in FIG. 7C is bent, the first two-dimensional grid 110 is bi-directionally reinforced, and thus bidirectional support can be possible.

Therefore, the warp direction of the three-dimensional textile reinforcement material 100 according to one embodiment of the present disclosure is reinforced by the first two-dimensional grid warp 112 and the second two-dimensional grid warp 122a. Further, when the first two-dimensional grid 110 and the second two-dimensional grid 120a are coupled, the coupled first two-dimensional grid 110 and the second two-dimensional grid 120a are coated with a thermosetting resin to support a concrete pouring pressure, and the three-dimensional textile reinforcement material 100 is completed. For example, FIG. 8C illustrates the completed three-dimensional textile reinforcement material 100.

According to one embodiment of the present disclosure, the two-dimensional grid is bent into a three-dimensional shape using the woven or knitted textile grid to form the three-dimensional grid 120, and the three-dimensional grid 120 is coupled with the at least one first two-dimensional grid 110 so as to have a three-dimensional structure. For example, as shown in FIG. 7E, when the first two-dimensional grid 110 and the three-dimensional grid 120 are coupled, and the first two-dimensional grid 130 is additionally coupled to an upper side of the coupled first two-dimensional grid 110 and the three-dimensional grid 120, the three-dimensional textile reinforcement material 100 in a space frame structure shape may be manufactured. Further, according to one embodiment of the present disclosure, when the two-dimensional grid, which is a textile grid, and the three-dimensional grid are coupled, the coupled two-dimensional grid and the three-dimensional grid are coated with a thermosetting resin and cured to support a concrete pouring pressure, and the three-dimensional textile reinforcement material may be formed, and thus the three-dimensional textile reinforcement material may be easily manufactured and structured in a multi-layered manner.

[Method of Constructing a Textile Reinforced Concrete Structure Using Three-Dimensional Textile Reinforcement Material]

Figure 9:
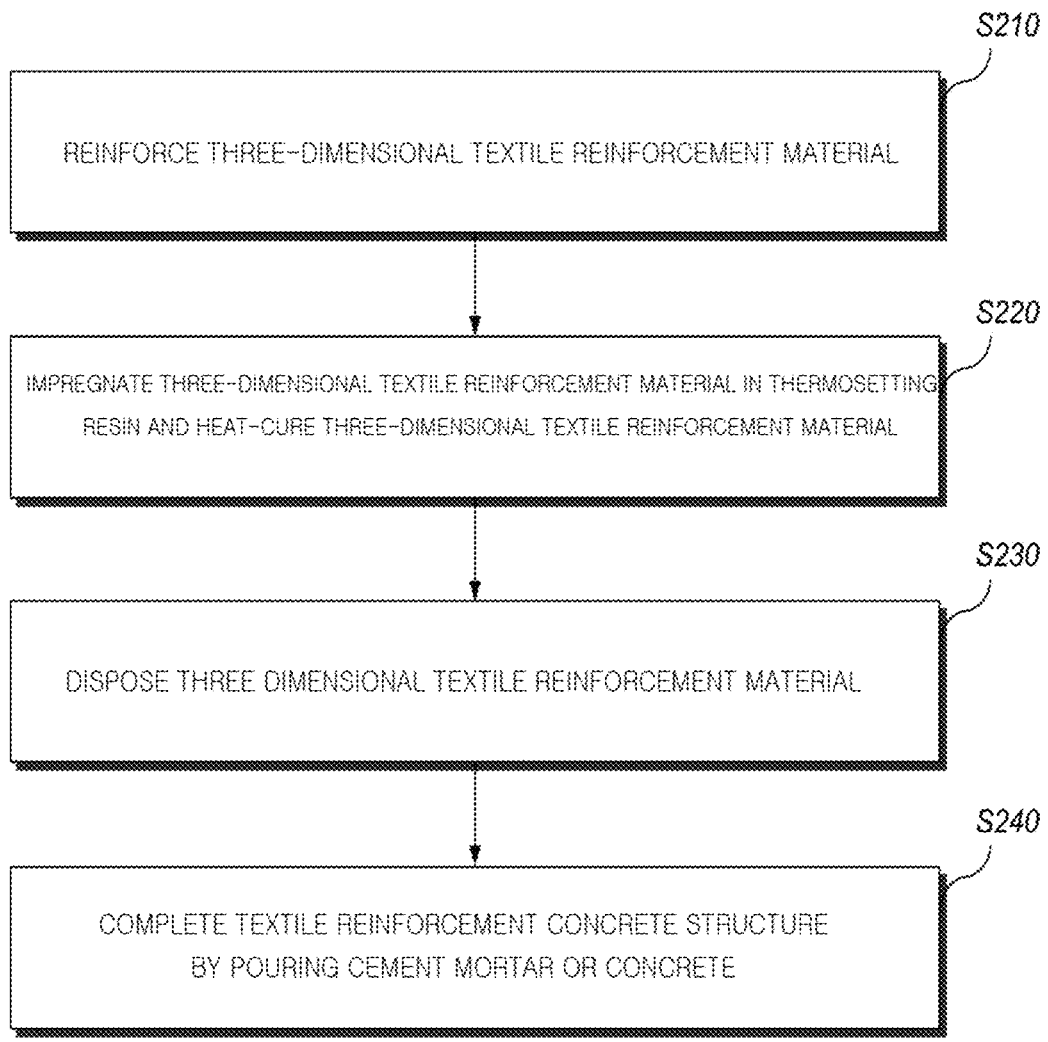
FIG. 9 is a process flowchart of a method of constructing a textile reinforced concrete structure using a three-dimensional textile reinforcement material according to one embodiment of the present disclosure.

FIG. 9 is a process flowchart of the method of constructing a textile reinforced concrete structure using a three-dimensional textile reinforcement material according to one embodiment of the present disclosure, and FIGS. 10A to 10D are example views illustrating a textile reinforced concrete structure using the three-dimensional textile reinforcement material according to one embodiment of the present disclosure.

Referring to FIG. 9, the method of constructing a textile reinforced concrete structure using a three-dimensional textile reinforcement material according to one embodiment of the present disclosure is as follows. The three-dimensional textile reinforcement material 100 is formed by coupling the first two-dimensional grid 110 and the three-dimensional grid 120 (S210). Specifically, as described above, the two-dimensional grid is bent into a three-dimensional shape to form the three-dimensional grid 120, and the three-dimensional grid 120 is coupled with the at least one first two-dimensional grid 110, and thus the three-dimensional textile reinforcement material 100 with a three-dimensional structure is manufactured.

The three-dimensional textile reinforcement material 100 is impregnated in a thermosetting resin and is heating-cured so as to be reinforced to resist concrete placing impact (S220).

The three-dimensional textile reinforcement material 100 is disposed at a predetermined position (S230).

A textile reinforced concrete structure 200 is completed by placing cement mortar or concrete 210 (S240).

Figure 10A:
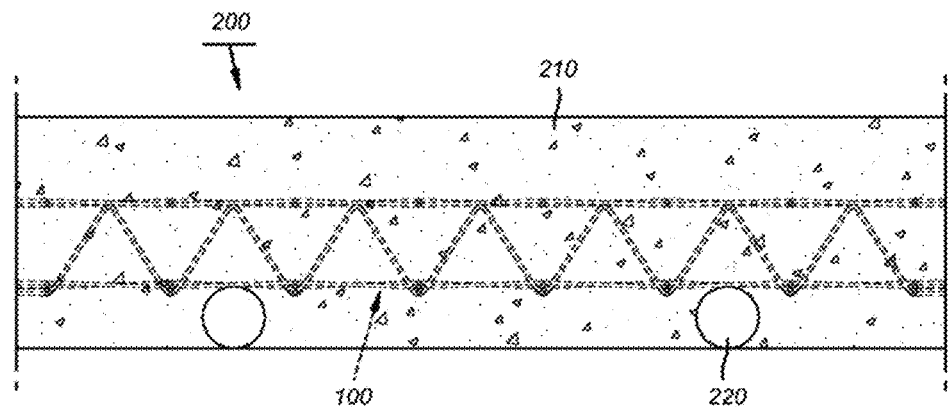
FIGS. 10A to 10D are example views illustrating a textile reinforced concrete structure using a three-dimensional textile reinforcement material according to one embodiment of the present disclosure.

Specifically, as shown in FIG. 10A, upper and lower layers of the three-dimensional textile reinforcement material 100 according to one embodiment of the present disclosure are coupled to the first two-dimensional grid 110, a truss structure is formed. The strut-tie in the truss structure allows the three-dimensional textile reinforcement material 100 to have high bending strength. For example, even when the three-dimensional textile reinforcement material 100 according to one embodiment of the present disclosure is disposed and a small number of spacers 220 support the three-dimensional textile reinforcement material 100 when a slab or a wall is constructed, a concrete placing pressure can be sufficiently supported.

Figure 10B:
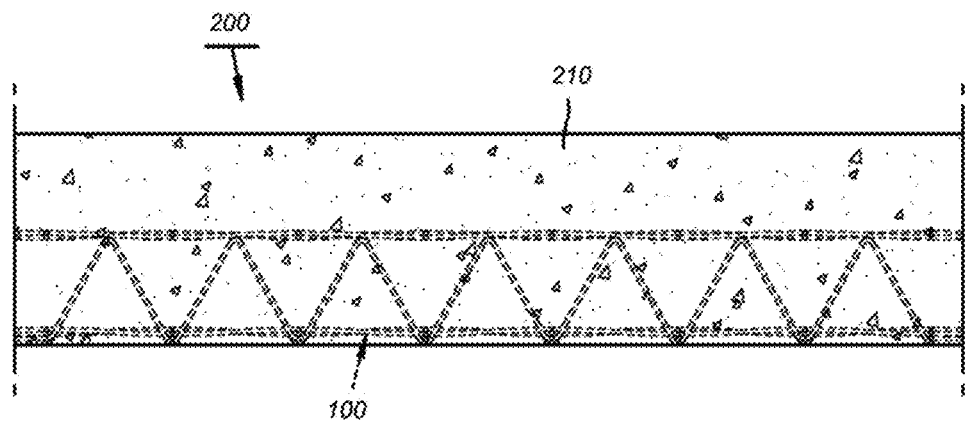

Further, as shown in FIG. 10B, when the three-dimensional textile reinforcement material according to one embodiment of the present disclosure is disposed in a slab mold or a wall mold, and concrete is poured in the mold, a predetermined position of the textile can be maintained without a separate spacer, and a concrete placing pressure can be supported.

Figure 10C:
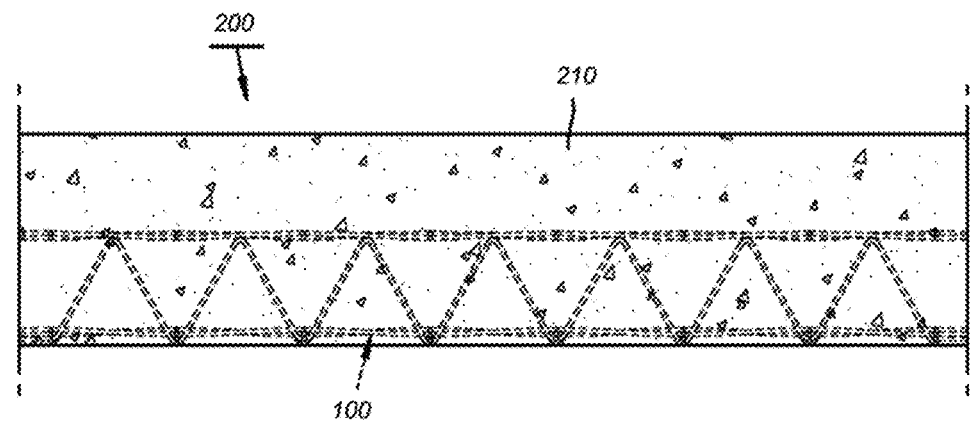

Further, as shown in FIG. 10C, the three-dimensional textile reinforcement material 100 according to one embodiment of the present disclosure may be manufactured and constructed in a multiple-layered manner.

Figure 10D:
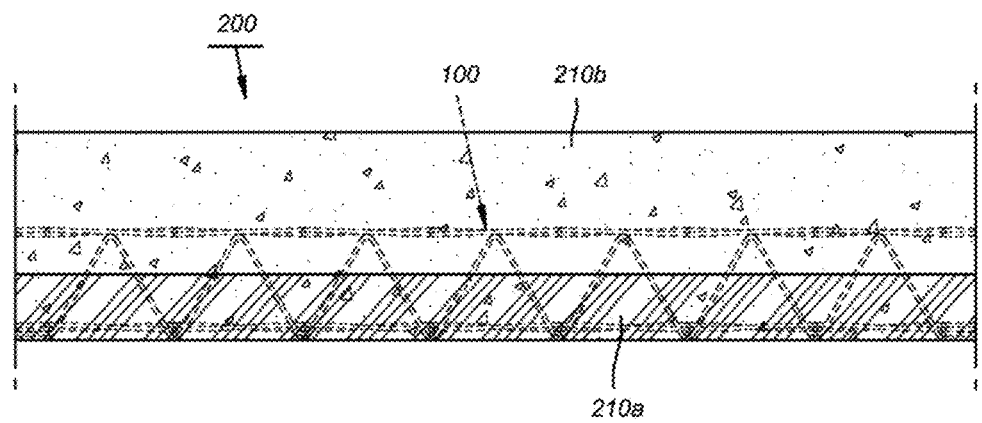

Further, as shown in FIG. 10D, the three-dimensional textile reinforcement material 100 according to one embodiment of the present disclosure functions as a shear connector required to integrate two layers 210a and 210b when a first layer 210a is constructed according to a construction process of the target concrete structure 200 and a second layer is formed. In this case, the bent three-dimensional grid weft 121 functions as an inclined member of the truss structure to resist shear stress generated on a cross-sectional surface of the textile reinforced concrete structure. Further, the bent three-dimensional grid weft 121 is applied to the delamination that may be generated when division-pouring is performed as a tension member, so as to suppress delamination.

Accordingly, the three-dimensional textile reinforcement material according to one embodiment of the present disclosure is formed in a truss structure, and thus the three-dimensional textile reinforcement material with high bending strength may be manufactured. Therefore, when the textile reinforced concrete structure using a three-dimensional textile reinforcement material is constructed, the three-dimensional textile reinforcement material can sufficiently support a concrete pouring pressure.

According to the present disclosure, a two-dimensional grid is bent into a three-dimensional shape using a two-dimensional woven or knitted textile grid, and the bent grid is coupled with at least one two-dimensional grid, and thus the three-dimensional textile reinforcement material can be simply and easily formed.

According to the present disclosure, when a two-dimensional grid, which is a textile grid, is coupled with a three-dimensional gird, a three-dimensional textile reinforcement material can be formed by coating the coupled grids with a thermosetting resin and curing the grids to support a concrete pouring pressure.

According to the present disclosure, a three-dimensional textile reinforcement material can be easily manufactured and constructed in a multi-layered manner.

According to the present disclosure, a three-dimensional textile reinforcement material is formed in a truss structure, and thus the three-dimensional textile reinforcement material can be manufactured to have high bending strength.

Therefore, a concrete pouring pressure can be sufficiently supported when a textile reinforced concrete structure is constructed using a three-dimensional textile reinforcement material.

The above description is only exemplary, and it should be understood by those skilled in the art that the present disclosure may be executed in other specific forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present disclosure is defined not by the detailed description but by the appended claims, and encompasses all modifications or alterations derived from meanings, the scope and equivalents of the appended claims.

What is claimed is:

1. A method of manufacturing a three-dimensional textile reinforcement material, the method comprising steps of:
    (a) forming a first two-dimensional grid by impregnating a two-dimensionally woven textile grid in a thermosetting resin and heat curing the two-dimensionally woven textile grid, the first two-dimensional grid including a first two-dimensional grid warp and weft;
    (b) forming a second two-dimensional grid by impregnating a two-dimensionally woven textile grid in a heated thermosetting resin and cool curing the two-dimensionally woven textile grid;
    (c) heat melting a bent position of the second two-dimensional grid;
    (d) bending the second two-dimensional grid at the bent position into a predetermined shape to form bent wefts;
    (e) cool curing the bent second two-dimensional grid; and
    (f) forming a three-dimensional textile reinforcement material by coupling the first two-dimensional grid and the bent second two-dimensional grid,
    wherein the second two-dimensional grid that is bent into a three-dimensional shape is inserted upward from a lower surface of the first two-dimensional grid so as to be primarily coupled therewith in order that the bent second two-dimensional grid is coupled with at least the one first two-dimensional grid so that the three-dimensional textile reinforcement material has a three-dimensional structure,
    wherein the bent second two-dimensional grid is inserted upward from the lower surface of the first two-dimensional grid, and the bent wefts on the second two-dimensional grid are disposed on both sides of the first two-dimensional grid warp,
    wherein, the first two-dimensional grid is reinforced by the bent second two-dimensional grid to perform bidirectional supporting.

2. The method of claim 1, wherein the first two-dimensional grid in the step (a) includes a weft and a warp and is manufactured in a weaving method or by stitching a portion at which the weft and the warp of weft and warp fiber rovings, which are disposed in a lattice form at a predetermined distances, cross each other with a third fiber.

3. The method of claim 1, wherein the second two-dimensional grid in the step (b) includes a weft and a warp, and a lattice distance in a warp direction of the second two-dimensional grid is the same as that of the first two-dimensional grid, but a lattice distance in a weft direction of the second two-dimensional grid is greater than a lattice distance in a weft direction of the first two-dimensional grid.

4. The method of claim 3, wherein, when the second two-dimensional grid is bent in the step (d), a height of the bent grid is the same as that of the three-dimensional textile reinforcement material, and the height of the three-dimensional textile reinforcement material is adjustable according to a distance in the weft direction of the second two-dimensional grid.

5. A three-dimensional textile reinforcement material manufactured by the method of manufacturing a three-dimensional textile reinforcement material as claimed in claim 1.

6. A method of constructing a textile reinforced concrete structure using a three-dimensional textile reinforcement material, wherein the method comprising steps of:
(a) forming a three-dimensional textile reinforcement material;
(b) reinforcing the three-dimensional textile reinforcement material by impregnating the three-dimensional textile reinforcement material with a thermosetting resin and heat curing the three-dimensional textile reinforcement material;
(c) disposing the three-dimensional textile reinforcement material at a predetermined position; and
(d) completing a textile reinforced concrete structure by pouring cement mortar or concrete,
wherein the three-dimensional textile reinforcement material is made by the method of claim 1.

7. The method of claim 6, wherein, when the three-dimensional textile reinforcement material in the step (c) is disposed in a slab or a wall mold and cement mortar or concrete is poured therein in the step (d), a position of a predetermined textile is maintained without a separate spacer, and a concrete pouring pressure is supported.

* * * * *